US006488110B2

(12) United States Patent
Price

(10) Patent No.: US 6,488,110 B2
(45) Date of Patent: Dec. 3, 2002

(54) VEHICLE DRIVE SYSTEM

(75) Inventor: Howard B. Price, Chesterfield, MO (US)

(73) Assignee: MTD Products Inc., Cleveland, OH (US)

( * ) Notice: Subject to any disclaimer, the term of this patent is extended or adjusted under 35 U.S.C. 154(b) by 0 days.

(21) Appl. No.: 09/782,379

(22) Filed: Feb. 13, 2001

(65) Prior Publication Data

US 2002/0108799 A1 Aug. 15, 2002

(51) Int. Cl.$^7$ ............................................. B60K 17/342
(52) U.S. Cl. ........................ 180/251; 180/233; 180/357; 280/124.117
(58) Field of Search .................................. 180/251, 239, 180/241, 245, 348, 357, 359, 361, 24.01, 24.11, 24.12, 233, 242, 358; 474/101, 109, 110, 111, 140, 148, 150; 280/124.145, 124.135, 124.116

(56) References Cited

U.S. PATENT DOCUMENTS

| | | | | |
|---|---|---|---|---|
| 1,173,486 A | * | 2/1916 | Cole | 180/24.12 |
| 1,436,373 A | * | 11/1922 | Walk | 180/241 |
| 1,891,642 A | * | 12/1932 | Harrison | 180/24.12 |
| 1,983,826 A | * | 12/1934 | Wilson | 480/24.12 |

(List continued on next page.)

FOREIGN PATENT DOCUMENTS

| | | |
|---|---|---|
| DE | 1031651 | 6/1958 |
| WO | WO 93/05974 | 4/1993 |

OTHER PUBLICATIONS

Notification of International Search Report —3 pages.
International Search Report —4 pages.

Primary Examiner—Anne Marie Boehler
Assistant Examiner—Daniel Yeagley
(74) Attorney, Agent, or Firm—Emerson & Skeriotis; Roger D. Emerson; Timothy D. Bennett

(57) ABSTRACT

A vehicle drive system comprises a frame, a motor, a first wheel assembly, a second wheel assembly and an endless drive member. The motor is mounted to the frame and has a motor shaft powered by the motor. The first wheel assembly includes a first axle, a first drive wheel and a first riding wheel. The first axle extends generally transversely from the frame and is journalled for rotation relative to the frame. A proximal end of the first axle is operatively connected to the motor shaft in a manner so that rotation of the motor shaft causes rotation of the first axle. The first axle is operatively connected to the frame in a manner so that a distal end of the first axle is moveable in a generally vertical arcuate path relative to the frame about a first pivot axis. The first drive wheel and the first riding wheel are both mounted to the first axle. Similarly, the second wheel assembly includes a second axle, a second drive wheel and a second riding wheel. The second axle extends generally transversely from the frame and generally parallel to the first axle. The second axle is journalled for rotation relative to the frame and is operatively connected to the frame in a manner so a distal end of the second axle is moveable in a generally vertical arcuate path relative to the frame about a second pivot axis. The second drive wheel and the second riding wheel are both mounted to the second axle. The endless drive member is trained around the first and second drive wheels in a manner so that rotational motion of the first drive wheel causes rotational motion of the second drive wheel.

22 Claims, 4 Drawing Sheets

U.S. PATENT DOCUMENTS

| | | | | |
|---|---|---|---|---|
| 2,176,386 A | * | 10/1939 | Anderson | 180/24.11 |
| 2,492,126 A | * | 12/1949 | Collender | 280/677 |
| 2,723,566 A | * | 11/1955 | Hyman | 474/111 |
| 2,771,147 A | * | 11/1956 | Ash | 180/6.2 |
| 2,901,051 A | | 8/1959 | Thibodeau | 180/41 |
| 3,048,233 A | | 8/1962 | Crain et al. | 180/251 |
| 3,157,238 A | * | 11/1964 | Kraemer et al. | 180/24.1 |
| 3,584,699 A | * | 6/1971 | Urick | 180/15 |
| 3,620,321 A | | 11/1971 | Thibodeau | 180/16 |
| 3,653,455 A | | 4/1972 | Hetteen | 180/251 |
| 4,210,218 A | | 7/1980 | Oswald et al. | |
| 4,249,631 A | * | 2/1981 | Huneke | 180/255 |
| 4,600,074 A | | 7/1986 | Watanabe et al. | 180/251 |
| 4,666,015 A | | 5/1987 | Matsuda et al. | 180/233 |
| 4,706,770 A | | 11/1987 | Simon | 180/24.02 |
| 4,786,075 A | * | 11/1988 | Takahashi | 180/254 |
| 5,409,250 A | * | 4/1995 | Csotonyi | 280/304 |

* cited by examiner

VEHICLE DRIVE SYSTEM

BACKGROUND OF THE INVENTION

The present invention relates to land vehicles and, more particularly, to utility vehicles adapted for multi-terrain use.

A variety of multiple-wheeled utility vehicles have been designed for light-duty work over a variety of terrain conditions. Many such vehicles include small beds or boxes for carrying modest loads. Typically, these vehicles have one or two steerable front wheels and at least two rear drive wheels. To increase the hauling capacity and the size of the load-carrying zone, some of these vehicles have been equipped with four or more rear drive wheels positioned under the hauling bed. Chain drives are commonly used in vehicles of this power class for transferring power from one set of drive wheels to another. In general, such chain drives are efficient, relatively inexpensive and easy to maintain and repair, as compared with more complicated drive systems that use intermeshed drive shafts and differentials.

However, in prior art utility vehicles utilizing a chain drive for four or more rear drive wheels, the rear drive wheels are unsuspended or are inadequately suspended. In some prior art utility vehicles utilizing a chain drive for four or more rear drive wheels, the rear drive wheels are not suspended at all, and remain in fixed positions relative to the vehicle frame. While unsuspended drive wheels work well with chain drives (which require the sprockets carrying the chain to remain in substantially the same plane to ensure proper operation and avoid disengagement of the chain), they compromise the vehicle's performance and limit the types of terrain on which the vehicle can be effectively used.

Thus, there is a need for a multi-terrain utility vehicle having multiple rear drive wheels all powered by a simple chain drive system, wherein each of the rear drive wheels is independently suspended from the vehicle frame for optimal performance and terrain versatility.

SUMMARY OF THE INVENTION

A general object of the invention is to provide a utility vehicle having multiple drive wheels for traversing a variety of terrain conditions. Another object is to provide a vehicle drive system that is efficient, relatively inexpensive and easy to maintain and repair. A related object is to provide chain-drive and suspension systems for utility vehicles that have fewer and less expensive parts than more complicated drive and suspension systems used in vehicles of the same power class, without significantly compromising performance. Still another object of the invention is to provide an idler mechanism for a chain drive that permits significant transverse movement of the drive chain without compromising performance of the drive system. A more specific object of the invention is to provide a drive system for a multi-terrain utility vehicle having multiple, chain-driven rear drive wheels that are each independently suspended from the vehicle frame.

In general, a vehicle drive system of the present invention comprises a frame, a motor, a first wheel assembly, a second wheel assembly and a drive chain. The motor is mounted to the frame and has a motor shaft powered by the motor. The first wheel assembly comprises a first control arm, a first axle, a first sprocket and a first wheel. The first control arm extends generally transversely from the frame and has a proximal end pivotally connected to the frame in a manner to permit pivoting movement of the first control arm in a generally vertical arcuate path relative to the frame. The first axle is journalled in the first control arm for rotation relative thereto. A proximal end of the first axle is operatively connected to the motor shaft in a manner so that rotation of the motor shaft causes rotation of the first axle. The first sprocket and first wheel are both fixedly mounted to the first axle. Similarly, the second wheel assembly comprises a second control arm, a second axle, a second sprocket and a second wheel. The second control arm extends generally transversely from the frame and generally parallel to the first control arm. The second control arm has a proximal end pivotally connected to the frame in a manner to permit pivoting movement of the second control arm in a generally vertical arcuate path relative to the frame. The second axle is journalled in the second control arm for rotation relative thereto. The second sprocket and second wheel are both fixedly mounted to the second axle. The drive chain is trained around the first and second sprockets in a manner so that rotational motion of the first sprocket causes rotational motion of the second sprocket.

In another aspect of the invention, a vehicle drive system comprises a frame, a motor, a first wheel assembly, a second wheel assembly and an endless drive member. The motor is mounted to the frame and has a motor shaft powered by the motor. The first wheel assembly includes a first axle, a first drive wheel and a first riding wheel. The first axle extends generally transversely from the frame and is journalled for rotation relative to the frame. A proximal end of the first axle is operatively connected to the motor shaft in a manner so that rotation of the motor shaft causes rotation of the first axle. The first axle is operatively connected to the frame in a manner so that a distal end of the first axle is moveable in a generally vertical arcuate path relative to the frame about a first pivot axis. The first drive wheel and the first riding wheel are both mounted to the first axle. Similarly, the second wheel assembly includes a second axle, a second drive wheel and a second riding wheel. The second axle extends generally transversely from the frame and generally parallel to the first axle. The second axle is journalled for rotation relative to the frame and is operatively connected to the frame in a manner so the distal end of the second axle is moveable in a generally vertical arcuate path relative to the frame about a second pivot axis. The second drive wheel and the second riding wheel are both mounted to the second axle. The endless drive member is trained around the first and second drive wheels in a manner so that rotational motion of the first drive wheel causes rotational motion of the second drive wheel.

In still another aspect of the invention, a vehicle drive system comprises a frame, a motor, a drive sprocket, a wheel assembly and a drive chain. The motor is mounted to the frame and has a motor shaft powered by the motor. The drive sprocket is operatively connected to the motor shaft in a manner so that rotational motion of the motor shaft causes rotational motion of the drive sprocket. The wheel assembly includes an axle, a follower sprocket and a wheel. The axle is journalled for rotation relative to the frame and is operatively connected to the frame in a manner so a distal end of the axle is moveable in a first generally vertical arcuate path relative to the frame about a pivot axis. The follower sprocket is fixedly mounted to the axle in a manner so that the follower sprocket is moveable in a second generally vertical arcuate path relative to the frame about the pivot axis. The wheel is mounted to the distal end of the axle. The drive chain is trained around the drive sprocket and the follower sprocket in a manner so that rotational motion of the drive sprocket causes rotational motion of the follower sprocket.

While the principal advantages and features of the present invention have been described above, a more complete and thorough understanding and appreciate for the invention may be attained by referring to the drawings and description of the preferred embodiments, which follow.

Figure 1:
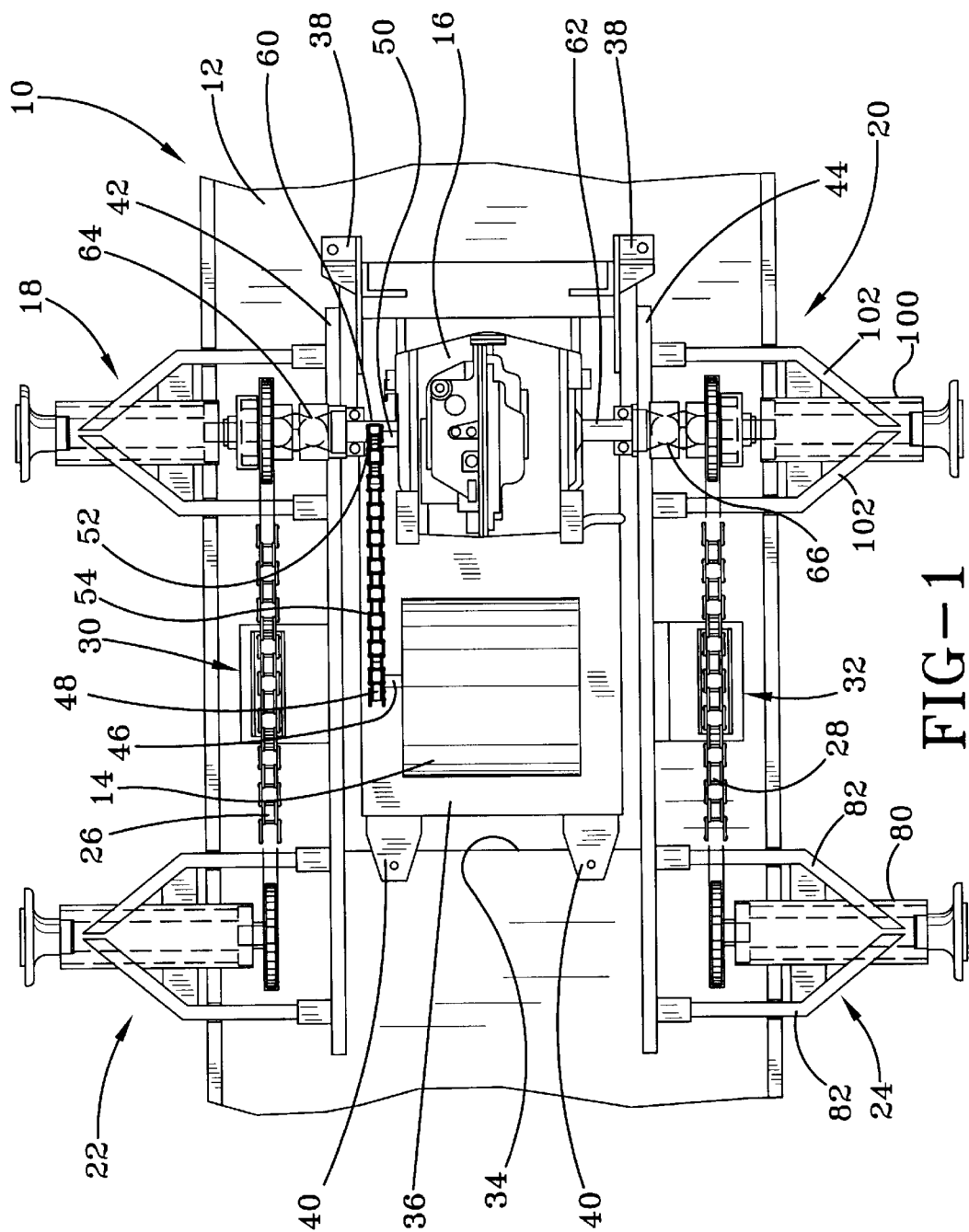
FIG. 1 is a top plan view of a vehicle drive system of the present invention.

Reference numerals in these figures correspond to reference numerals used in the following detailed description of the preferred embodiments.

DETAILED DESCRIPTION OF THE PREFERRED EMBODIMENTS

A vehicle drive system of the present invention is represented in its entirety in FIG. 1 by the reference numeral 10. In general, the vehicle drive system comprises a frame 12, a motor 14, a transmission 16, a pair of forward drive wheel assemblies 18 and 20, a pair of rear drive wheel assemblies 22 and 24, a pair of endless drive members 26 and 28, and a pair of idler mechanisms 30 and 32. The drive system 10 shown in FIG. 1 is adapted for use in a land vehicle having one or more steerable wheels (not shown) forward of the drive wheel assemblies 18 and 20.

As shown in FIG. 1, the frame 12 includes a generally rectangular opening 34. An inner platform 36 is positioned within the opening 34 and is adapted for supporting the motor 14 and transmission 16. Forward mounting flanges 38 and rear mounting flanges 40 connect the inner platform 36 to the main frame 12. Preferably, resilient cushioning members (not shown) are positioned between each of the forward and rear mounting flanges 38 and 40 and the main frame 12 to permit limited resilient movement between the inner platform 36 and main frame 12 to accommodate vibration. Preferably, the frame 12 also includes left and right wheel assembly support structures 42 and 44 extending along the sides of the rectangular opening 34. The function of these support structures 42 and 44 is described below.

The motor 14, preferably an internal combustion engine, is mounted on the inner platform 36. As shown in FIG. 1, the motor 14 has an output shaft 46 projecting from its left side. A drive pulley 48 is mounted to a distal end of the output shaft 46. The transmission 16 is mounted on the inner platform 36 just forward of the motor 14. The transmission 16 has an input shaft 50 projecting from its left side. A driven pulley 52 is mounted to a distal end of the input shaft 50. A drive belt 54 is trained or looped around the drive pulley 48 and the driven pulley 52 for delivering power from the output shaft 46 of the motor 14 to the input shaft 50 of the transmission. Alternatively, the drive pulley 48 and driven pulley 52 could be toothed sprockets and the drive belt 54 could be a drive chain, as is well known in the art.

Preferably, the transmission 16 includes co-linear left and right drive shafts 60 and 62. Distal ends of the left and right drive shafts 60 and 62 are coupled with left and right universal joints 64 and 66, the functions of which are described below.

With continued reference to FIG. 1, the left forward drive wheel assembly 18 is mounted to the frame 12 adjacent the left side of the transmission 16 in line with the left drive shaft 60, and the right forward drive wheel assembly 20 is mounted to the frame 12 adjacent the right side of the transmission 16 in line with the right drive shaft 62. The left rear drive wheel assembly 22 is mounted to the frame 12 behind the left forward drive wheel assembly 18, and the right rear drive wheel assembly 24 is mounted to the frame 12 behind the right forward drive wheel assembly 20.

Figure 2:
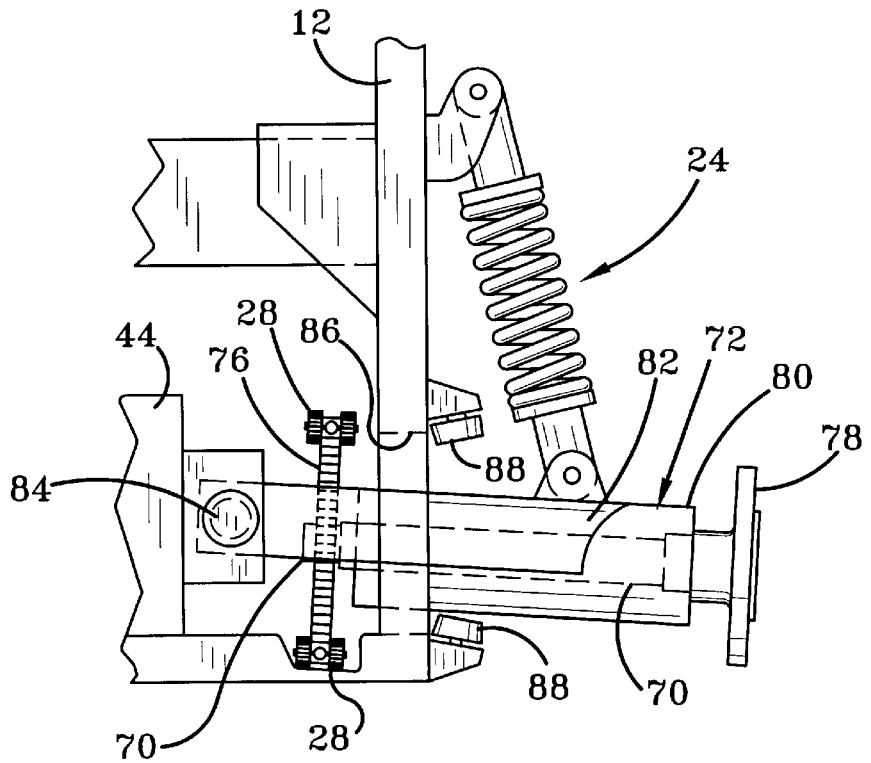
FIG. 2 is a fragmented, end detail view of a rear wheel assembly, shown in a down position.
Figure 3:
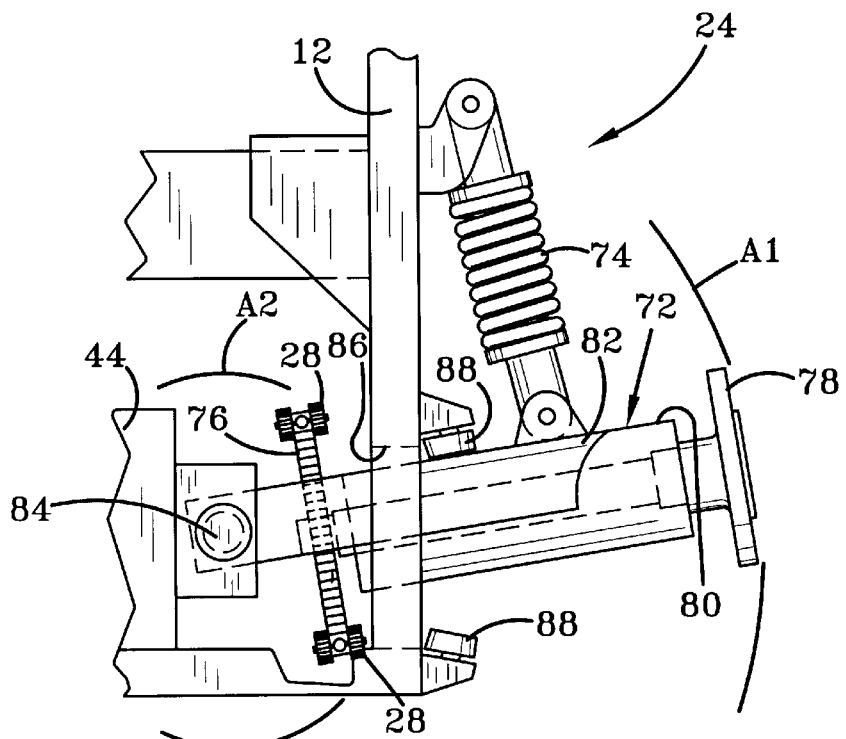
FIG. 3 is a fragmented, end detail view of the wheel assembly of FIG. 2, shown in an up position.

FIGS. 2 and 3 are fragmented, end detail views of the right rear wheel assembly 24. The right rear wheel assembly 24 will be discussed in detail, but it should be understood that the left rear wheel assembly 22 is substantially the same as, and is essentially a mirror image of, the right rear wheel assembly 24.

With particular reference to FIG. 2, the right rear wheel assembly 24 comprises an axle 70 (shown in phantom), a control arm 72, a shock absorber 74, a driven pulley or sprocket 76 and a wheel 78. The control arm 72 comprises a central, axle-supporting portion 80 and a pair of lateral support members 82 that give the control arm 72 an A-frame configuration (see FIG. 1). The central, axle-supporting portion 80 and lateral support members 82 are configured so that the central, axle-supporting portion 80 extends generally transversely from the frame. Proximal ends of the lateral support members 82 are pivotally connected to the support structure 44 of the frame 12 by pivot bolts 84. Distal ends of the lateral support members 82 are fixedly connected, such as by welding, to the central, axle-supporting portion 80 of the control arm 72 so that the central, axle-supporting portion 80 and the lateral support members 82 of the control arm 72 all pivot relative to the frame 12 as a unit between a down position (shown in FIG. 2) and an up position (shown in FIG. 3). The lateral support members 82 pass through openings 86 in the frame 12 that are sized to accommodate the lateral support members 82 as the wheel assembly 24 moves up and down, as shown in FIGS. 2 and 3. Resilient bumpers 88 are provided adjacent the upper and lower ends of the openings 86 and are adapted for engagement with the lateral support members 82 in a manner to limit the range of motion of the wheel assembly 24 between its up and down positions.

The shock absorber 74 is conventional. Preferably, an upper end of the shock absorber 74 is connected to the frame 12 and a lower end of the shock absorber 74 is connected to the central, axle-supporting portion 80 of the control arm 72. Preferably, the shock absorber 74 is preloaded in the downward direction so as to urge the control arm 72 downwardly to support the weight of the vehicle and any load carried by the vehicle. The shock absorber is adapted to dampen movement of the first control arm relative to the frame and absorb shock during operation of the vehicle, as is well known in the art. FIG. 2 illustrates the relative positions of the various components of the right rear wheel assembly 24 when in a normal, down position. FIG. 3 illustrates the relative positions of the various components of the right rear wheel assembly 24 when in an up position. As discussed below more fully, it can be seen in FIGS. 2 and 3 that all components of the right rear wheel assembly 24 pivot relative to the frame 12 about the same pivot axis.

The axle 70 is journalled for rotation in the central, axle-supporting portion 80 of the control arm 72. The driven sprocket 76 is mounted to a proximal end of the axle 70 for rotation therewith. The wheel 78 (or hub) is mounted to a distal end of the axle 70 for rotation therewith. The wheel 78 is adapted to carry a wheel rim (not shown) on which is mounted a pneumatic tire (not shown). Preferably, the tires are of relatively low pressure, high flotation design to aid in stability and shock absorption. As shown in FIGS. 2 and 3, the driven sprocket 76 and wheel 78 are preferably fixedly mounted to axle 70 so that they pivot relative to the frame 12 along with the other components of the wheel assembly 24.

Figure 4:
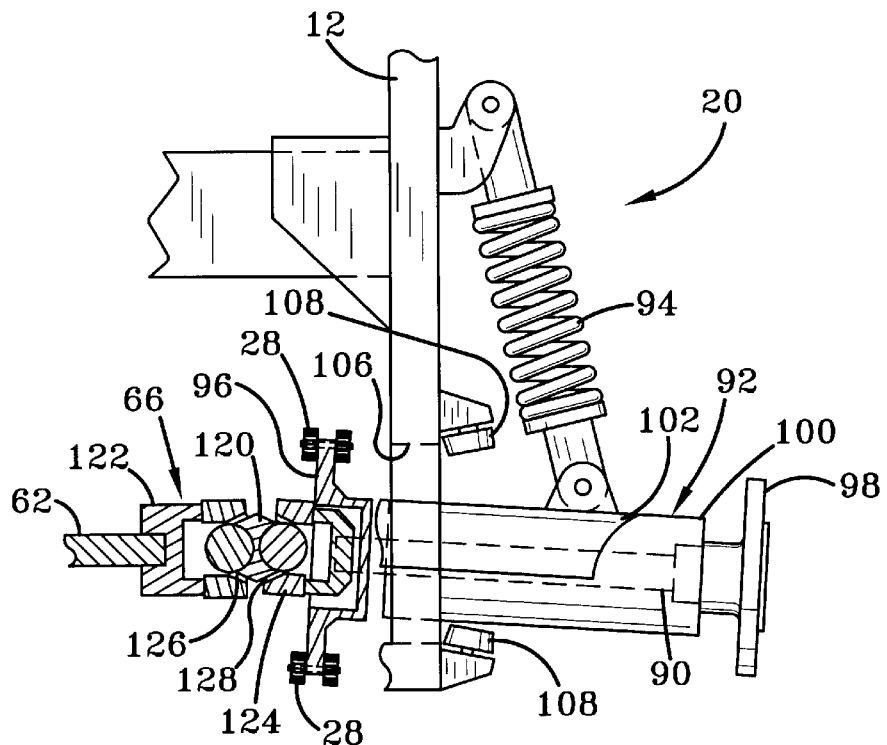
FIG. 4 is a fragmented, end detail view of a front wheel assembly, shown in a down position.
Figure 5:
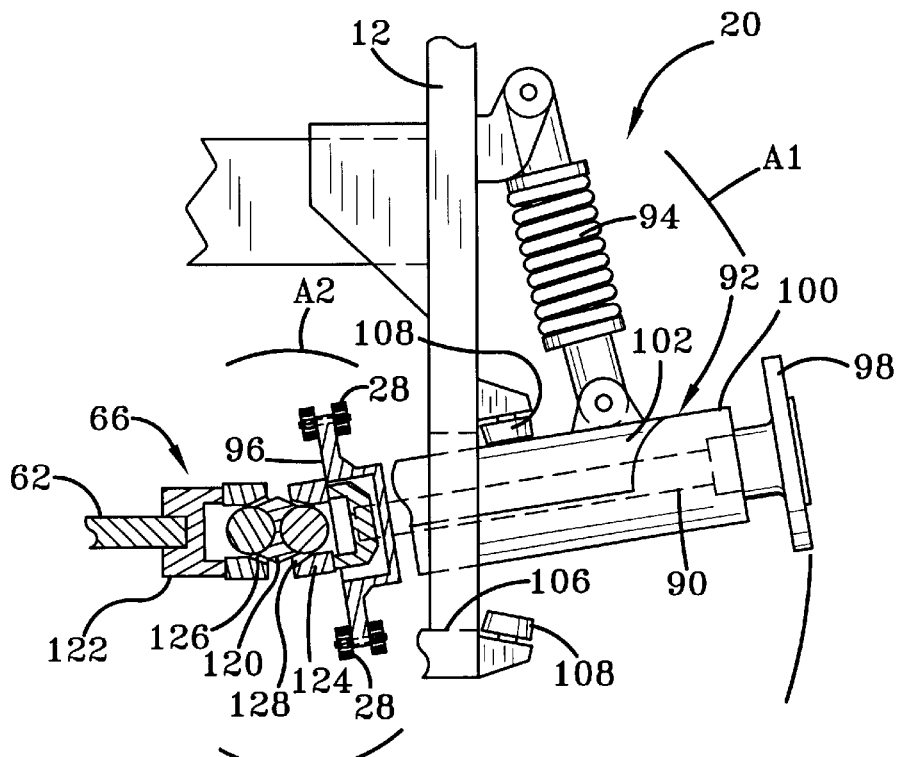
FIG. 5 is a fragmented, end detail view of the front wheel assembly of FIG. 4, shown in an up position.

FIGS. 4 and 5 are fragmented, end detail views of the right forward drive wheel assembly 20. The right forward wheel assembly 20 will be discussed in detail, but it should be understood that the left forward wheel assembly 18 is substantially the same as, and is essentially a mirror image of, the right forward wheel assembly 20.

With particular reference to FIG. 4, the right forward wheel assembly 20 comprises an axle 90 (shown partially in phantom), a control arm 92, a shock absorber 94, a drive pulley or sprocket 96 and a wheel 98. The control arm 92 is substantially identical to the control arm 72 of the right rear wheel assembly 24 discussed above and comprises a central, axle-supporting portion 100 and a pair of lateral support members 102 that give the control arm 92 an A-frame configuration (see FIG. 1). The central, axle-supporting portion 100 and lateral support members 102 are configured so that the central, axle-supporting portion 100 extends generally transversely from the frame and generally parallel to the central, axle-supporting portion 80 of the right rear wheel assembly 24. Proximal ends of the lateral support members 102 are pivotally connected to the support structure 44 of the frame 12 by pivot bolts (not shown). In FIGS. 4 and 5, the proximal ends of the lateral support members 102 are broken away to shown detail of other components of the right forward wheel assembly 20, discussed below, so these pivotal connections are not shown in FIGS. 4 and 5. However, the pivotal connections of the proximal ends of the lateral support members 102 to the support structure 44 are substantially the same as the pivotal connections of the proximal ends of the lateral support members 82 of the right rear wheel assembly 24 to the support structure 44, as discussed above. Distal ends of the lateral support members 102 are fixedly connected, such as by welding, to the central, axle-supporting portion 100 of the control arm 92 so that the central, axle-supporting portion 100 and the lateral support members 102 of the control arm 92 all pivot relative to the frame 12 as a unit between a down position (shown in FIG. 4) and an up position (shown in FIG. 5). The lateral support members 102 pass through openings 106 in the frame 12 that are sized to accommodate the lateral support members 102 as the wheel assembly 20 moves up and down, as shown in FIGS. 4 and 5. Resilient bumpers 108 are provided adjacent the upper and lower ends of the openings 106 and are adapted for engagement with the lateral support members 102 in a manner to limit the range of motion of the wheel assembly 20 between its up and down positions.

The shock absorber 94 operates in the same manner as the shock absorber 74 of the right rear wheel assembly 24, discussed above. Preferably, an upper end of the shock absorber 94 is connected to the frame 12 and a lower end of the shock absorber 94 is connected to the central, axle-supporting portion 100 of the control arm 92. FIG. 4 illustrates the relative positions of the various components of the right forward wheel assembly 20 when in a normal, down position. FIG. 5 illustrates the relative positions of the various components of the right forward wheel assembly 20 when in an up position. As shown in FIGS. 4 and 5, all components of the right forward wheel assembly 20 pivot relative to the frame 12 about the same pivot axis. As discussed below, preferably, the pivot axis of the right forward wheel assembly 20 is co-linear with the pivot axis of the right rear wheel assembly 24. Similarly, the pivot axis of the left forward wheel assembly 18 is preferably co-linear with the pivot axis of the left rear wheel assembly 22.

The axle 90 is journalled for rotation in the central, axle-supporting portion 100 of the control arm 92. The drive sprocket 96 is mounted to a proximal end of the axle 90 for rotation therewith. The wheel 98 (or hub) is mounted to a distal end of the axle 90 for rotation therewith. The wheel 98 is adapted to carry a wheel rim (not shown) on which is mounted a pneumatic tire (not shown), similar to the wheel rim and tire mounted on the wheel 78 of the right rear wheel assembly 24. As shown in FIGS. 4 and 5, the drive sprocket 96 and wheel 98 are preferably fixedly mounted to axle 90 so that they pivot relative to the frame 12 along with the other components of the wheel assembly 20.

The drive sprocket 96 is coupled to the universal joint 66, which transmits power from the drive shaft 62 to the axle 90 while permitting pivoting movement of the axle 90 relative to the frame 12 along with the other components of the right forward wheel assembly 20. Preferably, the universal joint 66 is a double universal joint comprising an inner double yoke 120, a first joint yoke 122 and a second joint yoke 124. The first and second joint yokes 122 and 124 have cross members 126 and 128 that pivotally connect first and second joint yokes 122 and 124 with the inner double yoke 120. The double universal joint is preferred because it allows an additional degree of freedom between the drive shaft 62 and the axle 90, to accommodate not only the pivoting movement of the axle 90 relative to the frame 12 but also any movement between the inner platform 36 (on which the transmission 16 is mounted) and the main frame portion 12 (to which the axle 90 is pivotally connected).

Figure 6:
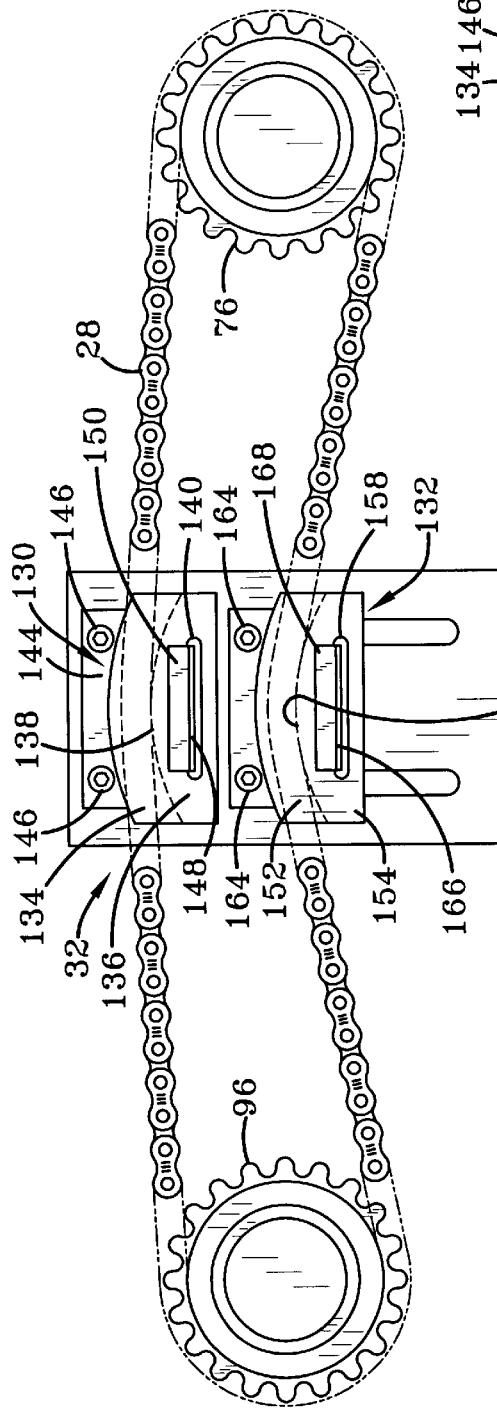
FIG. 6 is a side elevational view of an idler mechanism of the present invention.

Preferably, the endless drive member 28 is a drive chain, which is trained around the drive sprocket 96 of the right forward wheel assembly 20 and the driven sprocket 76 of the right rear wheel assembly 24 in a manner so that rotational motion of the drive sprocket 96 is transmitted into rotational motion of the driven sprocket 76. Similarly, the drive chain 26 is trained around the drive sprocket the left forward wheel assembly 18 and the driven sprocket of the left rear wheel assembly 22 in a manner so to transmit rotational motion of the drive sprocket into rotational motion of the driven sprocket. FIG. 6 is a side elevational view of the drive chain 28 trained around the drive sprocket 96 and driven sprocket 76. FIG. 6 is viewed from the interior portion of the frame 12 looking out. The drive chain 26 is not shown in detail in the Figures, but operates in the same manner and is essentially a mirror image of the drive chain 28 shown in FIG. 6. Thus, the drive shaft 62 powers the right forward wheel 78 via the universal joint 66, drive sprocket 76 and axle 70, and also powers the right rear wheel 98 via the drive chain 28, driven sprocket 96 and axle 90. Similarly, the drive shaft 60 powers not only the left forward wheel, but also the left rear wheel via the drive chain 26.

Figure 7:
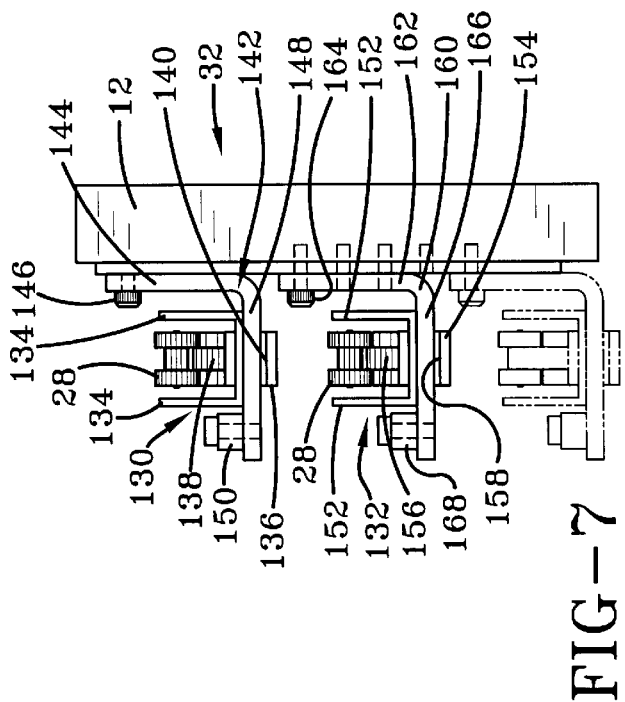
FIG. 7 is an end elevational view of the idler mechanism shown in FIG. 6.

The right idler mechanism 32 is shown in detail in FIGS. 6 and 7. The right idler mechanism 32 will be discussed in detail below, but it should be understood that the left idler mechanism 30 is substantially the same as, and is essentially a mirror image of, the right idler mechanism 32. In general, idlers for chain drives are well known in the art. These idlers are configured to apply a tension to the chain so it does not become uncogged from the driver or driven sprockets. Some conventional idlers include freely rotatable sprockets for engaging the chain. However, such sprocket idlers do not permit a great degree of lateral movement of the chain and, therefore, are not preferred in applications such as this one where the driver and driven sprockets do not always remain in a fixed plane during operation. Because each of the wheel assemblies 18, 20, 22 and 24 is independently pivotable relative to the frame 12, the driver sprockets 96 and driven sprockets 76 will not always be in the same plane. The idler mechanisms 30 and 32 of the present invention are designed to accommodate limited lateral movement of the drive chains 26 and 28 due to the independent pivoting movement of the wheel assemblies on which the driver and driven sprockets are mounted.

As shown in FIGS. 6 and 7, the idler mechanism 32 includes an upper carriage 130 and a lower carriage 132. The upper carriage 130 has guide portions 134 and a frame-engaging portion 136. The guide portions 134 extend upwardly from the frame-engaging portion 136 in a manner to guide movement of the drive chain 28 though the idler mechanism 32. The upper carriage 130 also includes a convex arcuate riding surface 138 adapted for sliding engagement with the drive chain 28 as the drive chain passes through the upper carriage 130 between the guide portions 134. The frame-engaging portion 136 of the upper carriage 130 includes a horizontal slot 140. As best shown in FIG. 7, a fixed support member 142 has a generally L-shaped cross-section. An upper portion 144 of the fixed support member 142 is secured to the frame 12 with mechanical fasteners 146. A generally planar lower portion 148 of the fixed support member 142 extends generally horizontally from the bottom of the upper portion 144 and passes through the horizontal slot 140 to support the upper carriage 130 in a manner to permit sliding lateral movement of the upper carriage 130 on the lower portion 148 of the fixed support member 142. A stop block 150 is connected to a distal end of the lower portion 148 to limit the lateral movement of the upper carriage 130 and to prevent it from sliding off of the fixed support member 142.

Similarly, the lower carriage 132 has guide portions 152 that extend upwardly from a frame-engaging portion 154 in a manner to guide movement of the drive chain 28, a convex arcuate riding surface 156 adapted for sliding engagement with the drive chain 28, and a horizontal slot 158. An adjustable support member 160 is substantially the same as the fixed support member 142. The adjustable support member 160 includes an upper portion 162 that is secured to the frame 12 with mechanical fasteners 164. As shown in FIG. 7, the adjustable support member 160 can be secured to the frame 12 in a range of positions relative to the fixed support member 142 to adjust the level of tension in the drive chain 28. A generally planar lower portion 166 of the adjustable support member 160 extends generally horizontally from the bottom of the upper portion 162 and passes through the horizontal slot 158 to support the lower carriage 132 for sliding lateral movement relative thereto. A similar stop block 168 is connected to a distal end of the lower portion 166 to limit the lateral movement of the lower carriage 132 and to prevent it from sliding off of the adjustable support member 160.

Thus, as the drive sprockets 96 and driven sprockets 76 are pivoted along with the other components of the wheel assemblies, the lateral displacement of the drive chains 26 and 28 caused by this pivoting movement of the sprockets is accommodated by the slidable movement of the upper and lower carriages 130 and 132 of the idler mechanisms 30 and 32.

It should be understood that, although the drive system of the present invention has been described as including sprockets 76 and 96 and drive chains 26 and 28, drive belts and pulleys could also be used without departing from the scope of the present invention. The idler mechanisms 30 and 32 of the present invention could also be used in connection with such drive belts and pulleys to perform the same function.

As discussed above, the various components of each wheel assembly are connected to one another in a manner so that the axle, sprocket and wheel all pivot together as a unit relative to the frame. These components move in generally vertical arcuate paths relative to the frame 12 as the wheel assemblies pivot relative to the frame. As shown in FIGS. 2 and 3, in the right rear wheel assembly 24, the distal end of the axle 70 moves in a first generally vertical arcuate path $A_1$ relative to the frame 12 about the pivot axis, and the driven sprocket 76 moves in a second generally vertical arcuate path $A_2$ relative to the frame 12 about the pivot axis. It can be seen in FIGS. 2 and 3 that the radius of arcuate path $A_2$ is less than the radius of arcuate path $A_1$. Preferably, the radius of arcuate path $A_2$ is less than ⅓ the radius of arcuate path $A_1$. This is preferable because positioning the sprockets 76 and 96 near the pivot axis results in less lateral displacement of the drive chains 26 and 28, especially when the drive sprocket 96 and driven sprocket 76 are in different planes (e.g., when the right forward wheel assembly 20 is in its up position and the right rear wheel assembly is in its down position).

In view of the above, it will be seen that the several objects of the invention have been achieved and other advantageous results have been attained. As various changes could be made without departing from the scope of the invention, it is intended that all matter contained in the above description and shown in the accompanying drawings shall be interpreted as illustrative and not in a limiting sense.

What is claimed is:

1. A vehicle drive system comprising:

a frame;

a motor mounted to the frame, the motor having a motor shaft powered by the motor;

a first wheel assembly comprising:

a first control arm extending generally transversely from the frame, the first control arm having a proximal end. pivotally connected to the frame in a manner to permit pivoting movement of the first control arm in a generally vertical arcuate path relative to the frame;

a first axle received within the first control arm for rotation relative thereto, a proximal end of the first axle being operatively connected to the motor shaft in a manner so that rotation of the motor shaft causes rotation of the first axle;

a first sprocket fixedly mounted to the first axle; and a first wheel fixedly mounted to the first axle;

a second wheel assembly comprising:

a second control arm extending generally transversely from the frame and generally parallel to the first control arm, the second control arm having a proximal end pivotally connected to the frame in a manner to permit pivoting movement of the second control arm in a generally vertical arcuate path relative to the frame;

a second axle received within the second control arm for rotation relative thereto;

a second sprocket fixedly mounted to the second axle; and a second wheel fixedly mounted to the second axle; and a drive chain trained around the first and second sprockets in a manner so that rotational motion of the first sprocket causes rotational motion of the second sprocket.

2. The vehicle drive system of claim 1 wherein the operative connection between the proximal end of the first axle and the motor shaft includes a universal joint that permits pivoting movement of the first axle relative to the motor shaft and relative to the frame when the first control arm pivots relative to the frame.

3. The vehicle drive system of claim 1 wherein the first axle is connected to the first control arm in a manner so that the first axle, first sprocket and first wheel all move in generally vertical arcuate paths relative to the frame along with the first control arm when the first control arm pivots relative to the frame, and wherein the second axle is connected to the second control arm in a manner so that the second axle, second sprocket and second wheel all move in generally vertical arcuate paths relative to the frame along with the second control arm when the second control arm pivots relative to the frame.

4. The vehicle drive system of claim 3 wherein the first and second control arms are moveable independently of one another.

5. The vehicle drive system of claim 4 wherein the first and second sprockets are moveable in their respective generally vertical arcuate paths independently of one another.

6. The vehicle drive system of claim 3 wherein the first control arm, first axle, first sprocket and first wheel all pivot about a first pivot axis and the second control arm, second axle, second sprocket and second wheel all pivot about a second pivot axis that is co-linear with the first pivot axis.

7. The vehicle drive system of claim 3 wherein the first axle and first control arm are connected to one another in a manner so that a distal end of the first axle moves in a first generally vertical arcuate path relative to the frame about a pivot axis, and the first sprocket is mounted to the first axle in a manner so that the first sprocket moves in a second generally vertical arcuate path relative to the frame about the pivot axis.

8. The vehicle drive system of claim 7 wherein a radius of the second generally vertical arcuate path is less than a radius of the first generally vertical arcuate path.

9. The vehicle drive system of claim 8 wherein the radius of the second generally vertical arcuate path is greater than zero.

10. The vehicle drive system of claim 8 wherein the radius of the second generally vertical arcuate path is less than ⅓ the radius of the first generally vertical arcuate path.

11. The vehicle drive system of claim 1 further comprising an idler mechanism that engages the drive chain between the first and second sprockets in a manner to maintain tension in the drive chain.

12. The vehicle drive system of claim 11 wherein the idler mechanism engages the drive chain in a manner that permits limited lateral movement of the drive chain relative to the frame to accommodate pivoting movement of first and second wheel assemblies.

13. The vehicle drive system of claim 12 wherein the idler mechanism includes a carriage having a guide portion and a frame-engaging portion, the guide portion being adapted to guide movement of the drive chain though the idler mechanism, the frame-engaging portion of the carriage engages the frame in a manner to permit limited sliding lateral movement of the carriage relative to the frame.

14. The vehicle drive system of claim 1 wherein the first axle is generally coextensive with the first control arm and the second axle is generally coextensive with the second control arm.

15. The vehicle drive system of claim 1 wherein the first wheel assembly further comprises a shock absorber having a first end connected to the first control arm and a second end connected to the frame in a manner for dampening movement of the first control arm relative to the frame.

16. The vehicle drive system of claim 1 wherein the first sprocket is mounted to the first axle generally adjacent the proximal end of the first axle and the second sprocket is mounted to the second axle generally adjacent the proximal end of the second axle.

17. The vehicle drive system of claim 1 wherein the first wheel is mounted to the distal end of the first axle and the second wheel is mounted to the distal end of the second axle.

18. A vehicle drive system comprising:

a frame;

a motor mounted to the frame, the motor having a motor shaft powered by the motor;

a first wheel assembly comprising:
    a first control arm extending generally transversely from the frame; a proximal end of the first control bar pivotally connected to the frame in a manner to permit pivoting movement of the first control arm in a generally vertical arcuate path relative to the frame;
    a first axle received within the first control arm for rotation relative thereto; a proximal end of the first axle being operatively connected to the motor shaft in a manner so that rotation of the motor shaft causes rotation of the first axle;
    a first sprocket fixedly mounted to the first axle, and
    a first wheel mounted to the first axle;
    wherein the first axle, first sprocket and first wheel all move in generally vertical arcuate paths relative to the frame along with the first control arm when the first control arm pivots relative to the frame;
    wherein the distal end of the first axle moves in a first generally vertical arcuate path relative to the frame about a pivot axis, and the first sprocket is mounted to the first axle in a manner so that the first sprocket moves in a second generally vertical arcuate path relative to the frame about the pivot axis;

a second wheel assembly comprising:
    a second control arm extending generally transversely from the frame and generally parallel to the first control arm and having a proximal end pivotally connected to the frame in a manner to permit pivoting movement of the second control arm in a generally vertical arcuate path relative to the frame;
    a second axle received within the second control arm for rotation relative thereto;
    a second sprocket mounted to the second axle; and
    a second wheel mounted to the second axle;
    wherein the second axle, second sprocket and second wheel all move in generally vertical arcuate paths relative to the frame along with the second control arm when the second control arm pivots relative to the frame;

wherein the distal end of the second axle moves in a first generally vertical arcuate path relative to the frame about a pivot axis, and the second sprocket is mounted to the first second in a manner so that the second sprocket moves in a second generally vertical arcuate path relative to the frame about the pivot axis;

wherein the radius of the second generally vertical arcuate path is less than 1/3 the radius of the first generally vertical arcuate path; and an endless drive member trained around the first and second sprockets in a manner so that rotational motion of the first sprocket causes rotational motion of the second sprocket.

19. The vehicle drive system of claim 18 Herein the endless drive member is a drive chain looped around the first and second sprockets.

20. The vehicle drive system of claim 18 wherein the first and second wheel assemblies further comprise a shock absorber having a first end connected to the first or second control arm and a second end connected to the frame in a manner for dampening movement of the control arm relative to the frame.

21. A vehicle drive system comprising:

a frame;

a motor mounted to the frame, the motor having a motor shaft powered by the motor;

a drive sprocket operatively connected to the motor shaft in a manner so that rotational motion of the motor shaft causes rotational motion of the drive sprocket;

a wheel assembly comprising: an axle journalled for rotation relative to the frame, the axle being operatively connected to the frame in a manner so that a distal end of the axle is moveable in a first generally vertical arcuate path relative to the frame about a pivot axis;

a follower sprocket fixedly mounted to the axle in a manner so that the follower sprocket is moveable in a second generally vertical arcuate path relative to the frame about the pivot axis;

wherein the radius of the second generally vertical arcuate path is less than 1/3 the radius of the first generally vertical arcuate path;

a wheel mounted to the distal end of the axle; and a drive chain trained around the drive sprocket and follower sprocket in a manner so that rotational motion of the drive sprocket causes rotational motion of the follower sprocket.

22. The vehicle drive system of claim 21 wherein the follower-sprocket is mounted to a proximal end of the axle and the proximal end of the axle is spaced from the pivot axis.

* * * * *